United States Patent
Nattrass et al.

3,961,655
June 8, 1976

[54] BULK MATERIAL CONTAINERS

[76] Inventors: Frank Nattrass, Fallows End, Brearton, Harrogate, Yorkshire; Peter Johnson Nattrass, Tresco, Chain Lane, Knaresborough, Yorkshire, both of England

[22] Filed: Sept. 16, 1974

[21] Appl. No.: 506,569

[30] Foreign Application Priority Data
Sept. 17, 1973 United Kingdom............... 43599/73

[52] U.S. Cl................................. 150/1; 222/181
[51] Int. Cl.²........................................ B65D 29/02
[58] Field of Search .................. 150/1, 1.7, 1.8, 11, 150/12, 2, 48, 50; 2/196, 209.1, 271; 112/120, 141, 142, 121.27; 222/105, 181

[56] References Cited
UNITED STATES PATENTS
2,212,390    8/1940    Conklin ........................... 150/1.7

| 3,292,813 | 12/1966 | Roegner | 150/1 |
| 3,331,513 | 7/1967 | Cappelli | 150/1 |
| 3,789,897 | 2/1974 | Saito | 150/1 |

*Primary Examiner*—Ro E. Hart
*Attorney, Agent, or Firm*—Stevens, Davis, Miller & Mosher

[57] ABSTRACT

A bag for transporting bulk material, comprising an outer bag member having a base section with an opening therein and side walls, means secured to upper parts of said side walls by way of which said bag may be lifted, an inner liner within said outer bag member, a lower end of said liner terminating in a tubular section, a retaining member normally retained at the base of said bag but capable of being released therefrom, means securing said tubular section to said retaining member, and a releasable closure means closing said tubular section.

3 Claims, 18 Drawing Figures

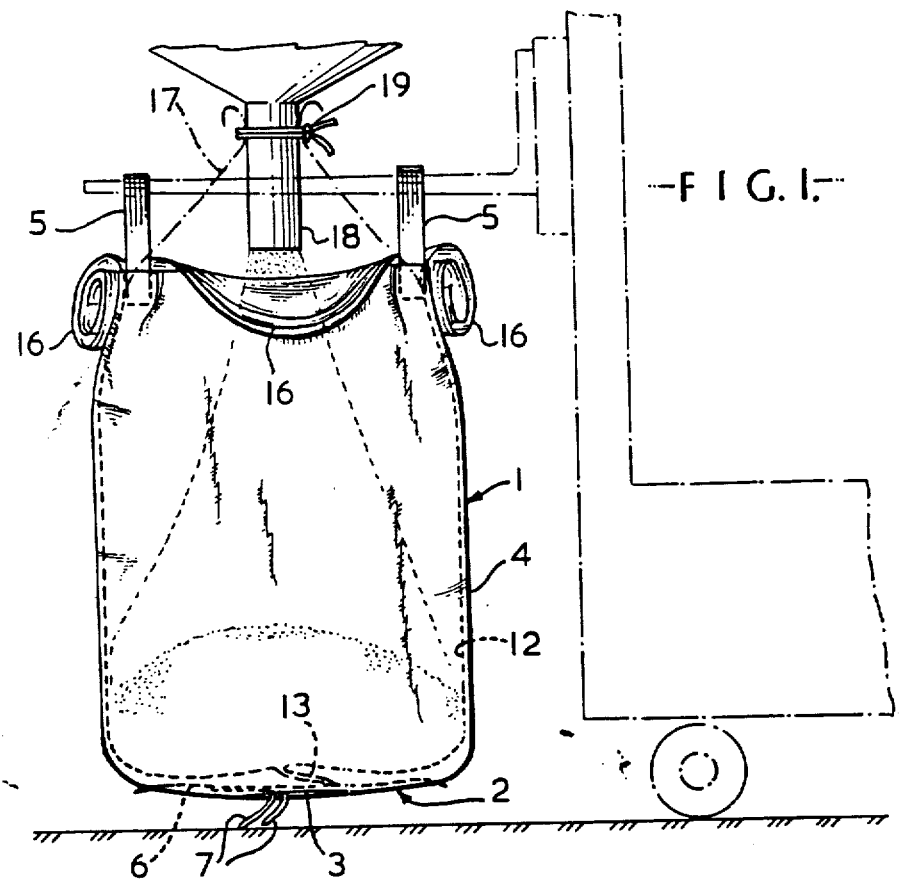
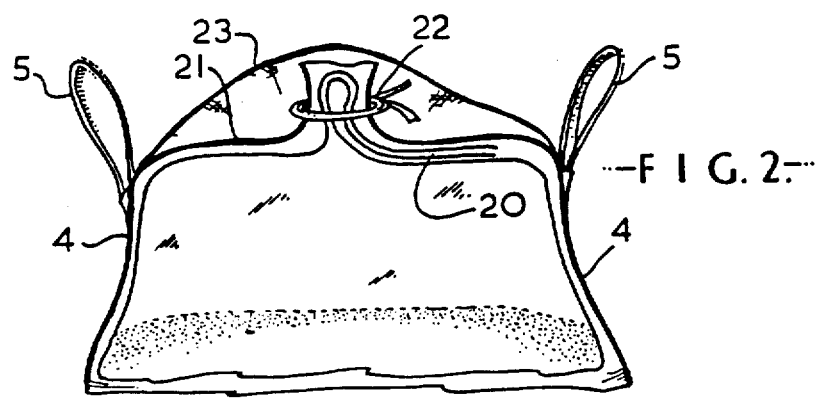

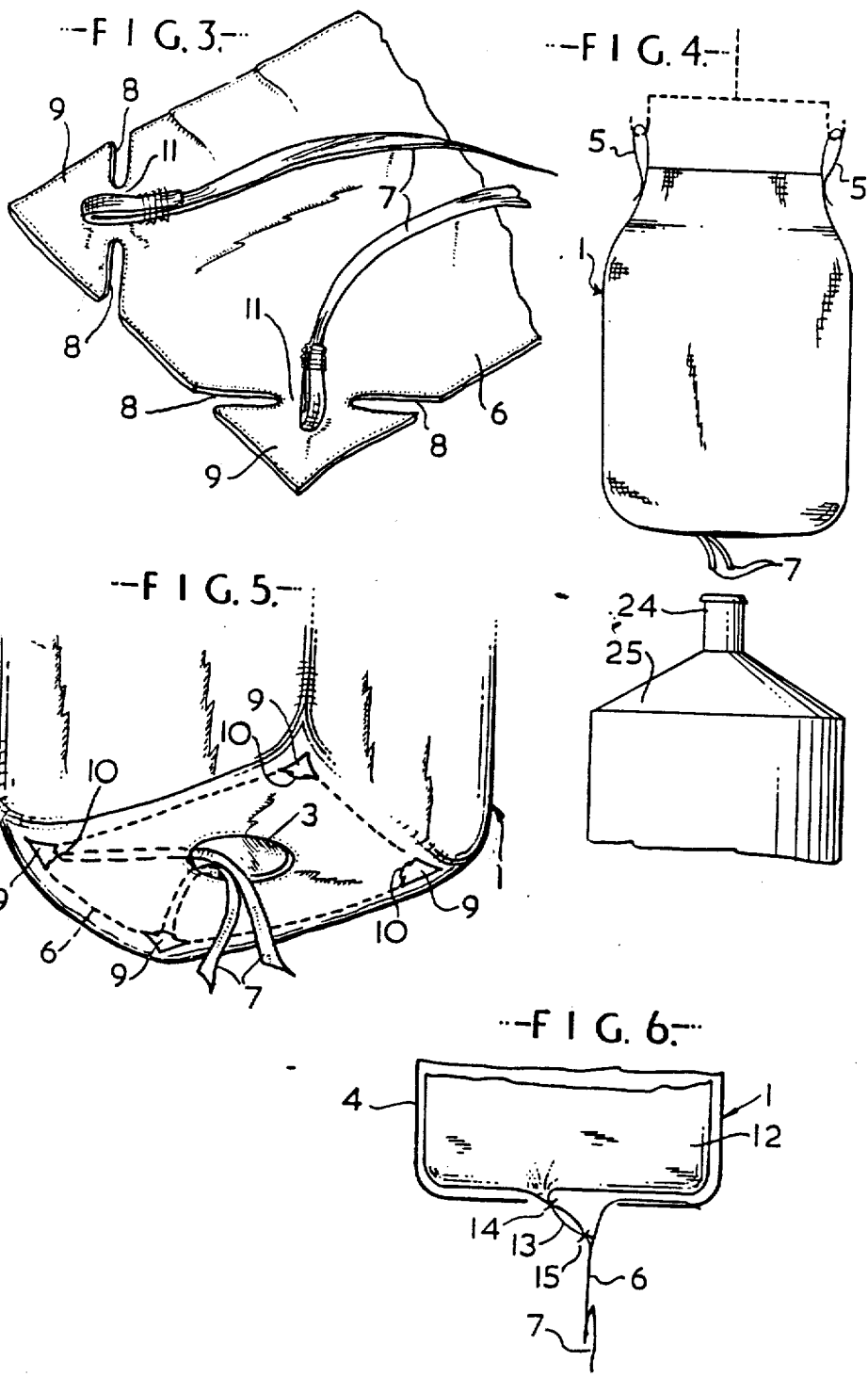

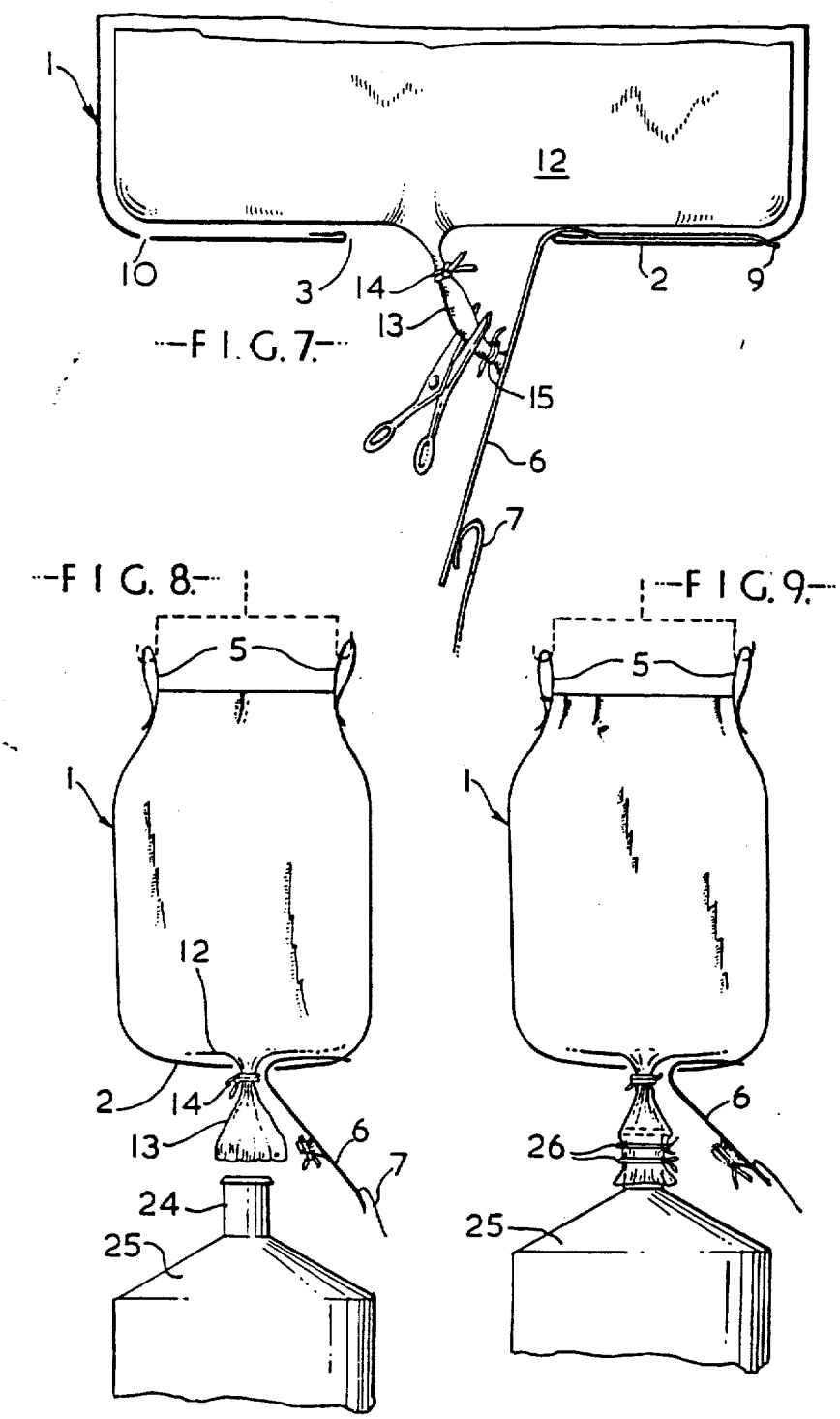

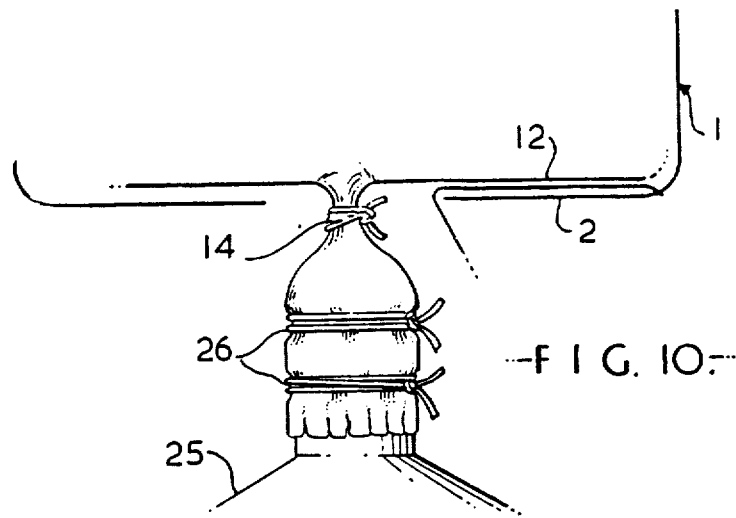
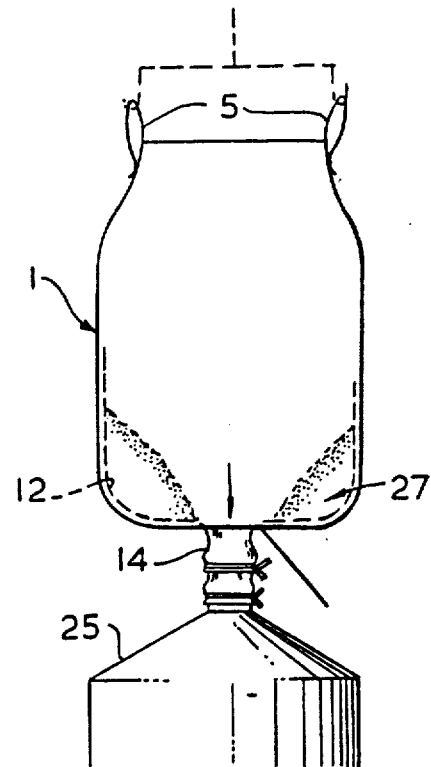
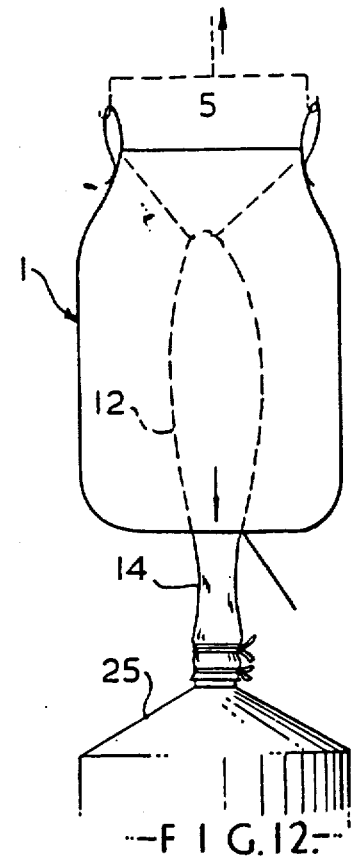

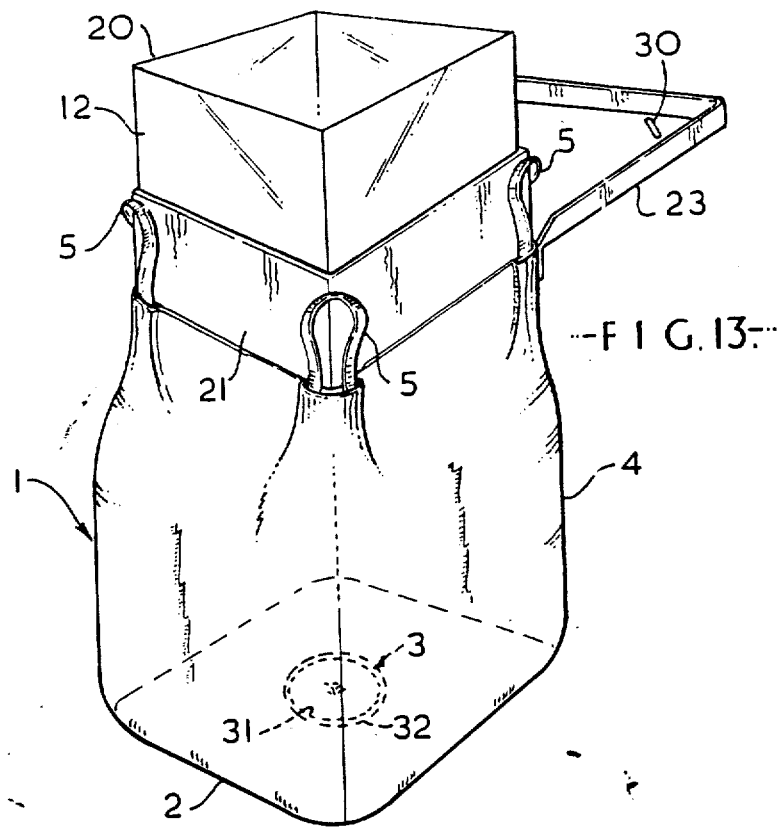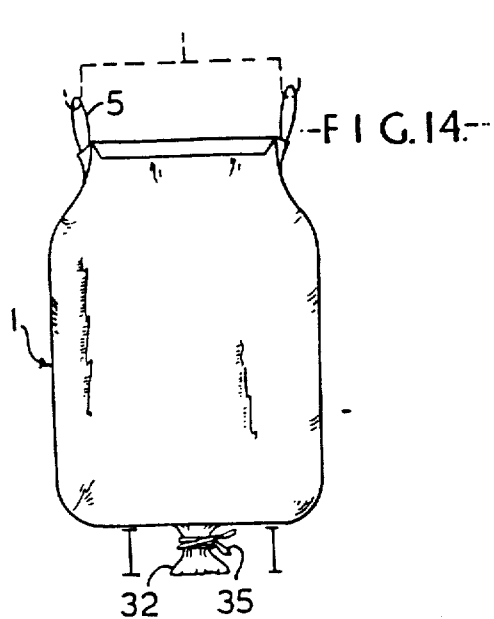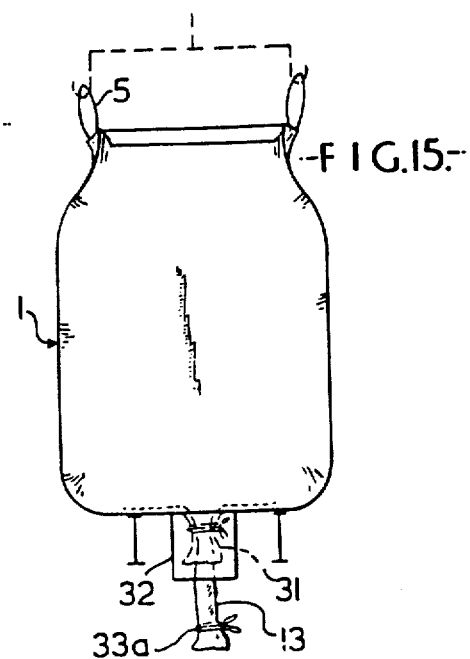

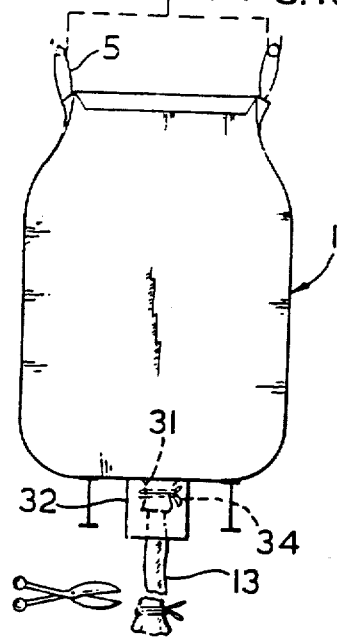
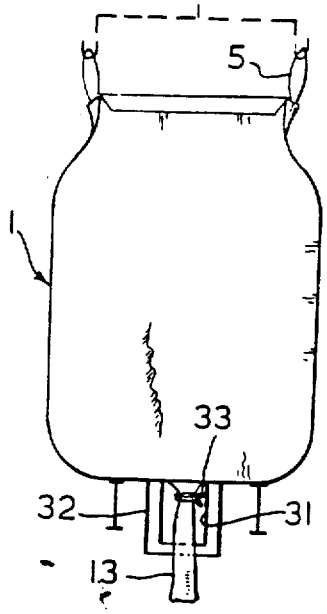
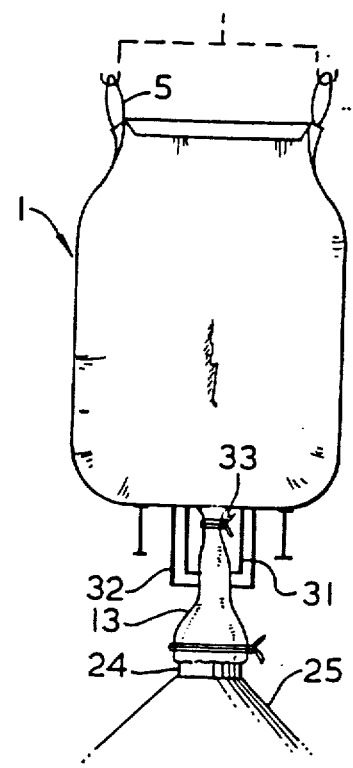

BULK MATERIAL CONTAINERS

This invention relates to containers for bulk material, particularly for comminuted material.

The use of large bags for transporting bulk quantities of powdered or granular material is known, and it is known to use bags of a disposable form, the bottom of the bag being cut away to allow material to fall out. Using such bags it is difficult to control the flow of material from the bag, and of course it would be desirable to re-use the bag.

According to the present invention a bag for transporting bulk material comprises an outer bag member having a base section with an opening therein and side walls, means secured to the upper parts of the side walls by way of which the bag may be lifted, an inner liner within the outer bag member, the lower end of the liner terminating in a tubular section secured to a retaining member normally retained at the base of the bag but capable of being released therefrom, and a releasable closure means closing the tubular section.

In use the inner liner of such a bag is filled with material and the liner is then closed at its upper end. When the bag is to be emptied the retaining member is released from the base section of the outer bag member. As the tubular section of the lower end of the liner is secured to the retaining member this tubular section will thus also be released. The tubular section is then released from the retaining member and can be opened out and secured around the entry tube to a receiving bin or other container. The closure means on the tubular section is then released, whereupon the material can flow into the container. The presence of the tubular section allows control of the flow of material from the bag, and when secured to a container entry tube ensures that the bag can be emptied with little or no material being released into the air. The outer bag member is re-usable, only the inner liner needing replacement although even this may be capable of limited re-use.

Preferably the upper end of the inner liner is also of tubular form and extends beyond the upper end of the side walls of the outer bag member. After filling this gives sufficient free liner material to be folded over and tied off to form a waterproof closure for the liner.

Conveniently a fabric skirt is secured to the upper edges of the side walls of the outer bag member to overlie the liner, the skirt having a central opening through which part of the liner may pass. This allows the upper end of the filled liner to be tied off to the skirt. This is important as it ensures that the liner can be completely emptied of material merely by lifting the bag slightly while the lower end of the liner is secured to the container entry tube.

The retaining member may take various forms. In one embodiment the member is a flap covering the opening in the base section and detachably held in the base section. Preferably the flap has a pull cord secured thereto which projects through the opening in the base section of the outer bag member. Pulling the cord will then pull the flap through the opening.

In another embodiment the retaining member is the innermost one of two tubes projecting downwardly from the base section of the bag around the opening. The tubular section of the lower end of the inner liner is then secured to the innermost tube and this arrangement is folded within the hollow outer tube which can be of the same fabric as, and considered a part of, the bag.

The invention will be better understood from the following description of two specific embodiments thereof, read in conjunction with the accompanying drawings in which:

FIG. 1 is a schematic view of a first embodiment of the bag before filling;

FIG. 2 is a schematic view of part of the bag of FIG. 1 after filling;

FIG. 3 shows a detail of the bag of FIG. 1;

FIGS. 4 to 12 show different stages of discharging the contents of the bag of FIG. 1;

FIG. 13 shows a schematic view of a second embodiment of the bag; and

FIGS. 14 to 18 show different stages of discharging the contents of the bag of FIG. 13.

As shown in FIG. 1 the bag comprises an outer bag member 1 having a base section 2 with an opening 3 therein and side walls 4. Four lifting loops such as 5 are stitched to the upper parts of the side walls. Other means by way of which the bag may be lifted can be used, but loops are preferred, and the preferred method of securing these to the bag is as described in co-pending U.S. Pat. application Ser. No. 454,829, filed Mar. 26, 1974. To provide a single point lift the loops at two adjacent corners may be interlocked or otherwise joined together, and the loops at the other two adjacent corners may also be interlocked or joined. A cross strap is then secured around the two sets of joined loops to extend across the top of the bag and provide a lifting point engageable by a single lifting element.

The opening 3 is covered by a retaining flap 6 in the base section and two pull cords or straps 7 are stitched to the flap and project through the opening 3. Each corner of the flap is as shown in FIG. 3 with two slots 8 cut diagonally part-way across the corner. Each corner section 9 of the flap is folded and taken through a slit 10 formed in the base section 2, the width of the slit being only slightly greater than the width of the neck 11 between the two slots 8. Fitting the corners 9 through the slits 10 thus releasably holds the flap in position in the bottom of the bag.

Fitting within the outer bag member is an inner liner 12 which may conveniently be made of impervious plastic material. At its lower end the liner terminates in a tubular section 13 which is secured to the flap 6. Two cords 14, 15 are tied around the tubular section 13 to close off the inside of the liner. During filling, as shown in FIG. 1, the upper part of the liner may be folded over the upper edges of the side walls of the outer bag member as indicated by the folds 16, or if desired, the top end of the liner may extend upwardly, as shown by the chain lines 17 and may be tied around the spout 18 of a loading hopper by a cord 19.

To fill the bag the lifting loops 5 are engaged by a crane or by the fork of a fork lift truck to suspend the bag above the ground as shown in FIG. 1. With the upper end of the liner in either of the formations described material is allowed to flow from the hopper into the bag until the liner is filled to the required level. Once full an upper tubular part 20 of the inner liner is folded back upon itself in swan neck form, as shown in FIG. 2, to give a waterproof closure to the liner. The folded part of the swan neck closure is positioned within a central opening formed in a skirt 21 which is an annular piece of fabric stitched to the upper ends of the side walls 4. The swan neck closure is tied off and secured to the skirt by a cord 22 and an outer lid 23 may then be fitted over the skirt to give additional protection. In its filled form the bag can be transported and stacked as desired.

When the contents of the bag are to be discharged the bag is lifted into position above an entry tube 24 to a receiving container 25 with the opening 3 in the base section of the bag positioned substantially directly above the entry tube 24. The bag is then positioned as shown in FIG. 4 and an underneath view of the bag as in FIG. 5 shows that the flap is held in position by its corners 9 and the pull cords 7 project through the opening 3 in the base section of the outer bag member.

To commence the discharge operation the pull cords 7 are grasped and are pulled downwardly to release the flap 6 and pull it at least partially through the opening 3. The tubular section 13 of the liner is thus pulled through the opening. The tubular section 13 is then cut close to the flap, as shown in FIG. 7, and the cut end of the tubular section is opened out, as shown in FIG. 8. The opened end is then fitted over the entry tube 24 to the receiving bin, as shown in FIG. 9, and is secured in place around the tube by cords 26. By loosening the cord 14 the tubular section 13 is opened so that the contents of the bag may flow by gravity through this section into the container 25. The fact that the section 14 is tied around the entry tube 24 prevents any of the material escaping into the atmosphere. The rate of discharge from the bag may be controlled by the degree of tightness of the cord 14.

With certain materials it is possible that when the bag is almost discharged some small pockets of material may remain in the lower corners of the bag, as indicated at 27 in FIG. 11, the amount of material left depending on the natural angle of repose of that material. If this happens this remaining quantity of material can be discharged by raising the bag through a further small distance. The anchorage of the upper end of the liner to the skirt 21 and the anchorage of the lower end of the liner to the entry tube 24 will mean that on raising the bag the liner is forced to take on a more elongated position, as shown in FIG. 12, so that all remaining material will pass into the container 25.

It will be apparent that various modifications may be made to different parts of the bag particularly in the manner in which various members are secured to each other and in the forms of closure members used for the tubular section 13 and upper closure section 20 of the liner. Different methods may be used for temporarily securing the flap 6 in the base section 2 of the bag and various types of releasable fastening can be used. One particularly suitable alternative is to have bits of hooked material at each corner of the flap engaging with similar bits being in the base section of the outer bag member. Suitable hooked material would be that sold under the name "Velcro".

Turning now to FIGS. 13 to 18 these show a bag similar in a number of respects to that already described, and similar parts are given the same reference numerals as for the bag shown in FIGS. 1 to 12. Thus the bag comprises an outer bag member 1 having a base section 2 with an opening 3 therein and side walls 4. Lifting loops 5 are stitched to the upper parts of the side walls and an inner liner 12 fits within the outer bag member and terminates at its lower end in a tubular section 13. The bag may be filled as described with reference to FIGS. 1 and 2 and after filling an upper tubular part 20 of the inner liner is folded and tied to skirt 21, which is then covered by the lid 23. The lid may have slots 30 through which the loops 5 may be passed.

The bag differs from that already described in the construction of the lower end of the bag. In this embodiment the bag has two short concentric tubes 31, 32 stitched to the base of the bag around the opening 3. The tubes are conveniently made from the same fabric as the outer bag member. The tubular section 13 of the inner liner is brought through the opening 3 and tied off with cords 33, 33a. The tubular section 13 projects through the inner tube 31 and is tied to the inner tube by a cord 34 extending around the inner tube. The inner tube 31 and tubular section 13 are then folded into the space within the outer tube 32 and the outer tube is tied with a cord 35 thus sealing off the base of the bag and enclosing the vulnerable end of the inner liner.

When the contents of the bag are to be discharged the bag is lifted into position above an entry tube 24 to a receiving container 25, with the outer tube 32 above the entry tube 24. The cord 35 is untied and discarded and the end of the tubular section 13 of the inner liner is unfolded and pulled into the position shown in FIG. 15. The end 36 of the section is cut off and the cord 34 loosened and discarded (FIG. 16). The cord 33 on the tubular section 13 is thus exposed (FIG. 17). The end of the tubular section 13 is fitted over the entry tube 24 and tied in position by cord 26 (FIG. 18). The cord 33 is now loosened and removed, whereupon the contents of the bag will flow into the container 25. As with the embodiment already described no material will escape to atmosphere, and the bag may be raised to discharge any material remaining in the lower corners of the bag after the main discharge has occurred.

The invention provides a container for bulk material which is simple to handle, is re-usable, ensures good protection of the material and is capable of being completely emptied without discharging any material into the atmosphere.

The preferred material for the outer bag member is woven unpigmented polypropylene, which may be subject to degradation by ultraviolet light. To retard this degradation the bag may be fitted with a shroud for shielding the outer bag member from ultraviolet light.

What we claim is:

1. A bag, for transporting bulk material, comprising:
   an outer bag member comprising:
   a base section having an opening defined therein; and
   sidewalls;
   means, secured to upper parts of said sidewalls, by which said bag may be lifted;
   an inner liner within said outer bag member, said inner liner having a lower end terminating in a tubular section;
   a first tube secured to said base section around the opening therein and projecting outwardly from said base section;
   a second tube secured to said base section;
   said first tube being disposed within said second tube;
   said tubular section being disposed within said first tube;
   means releasably securing said tubular section within said first tube; and
   means releasably closing said second tube with said tubular section and said first tube being restrained wholly within said second tube by said releasable closing means.

2. A bag as claimed in claim 1, wherein an upper end of said inner liner is of tubular form and extends beyond upper ends of said sidewalls of said outer bag member.

3. A bag as claimed in claim 1 wherein a fabric skirt is secured to upper edges of said sidewalls of said outer bag member to overlie said liner, said skirt having a central opening defined therein through which part of said liner may pass.

* * * * *